(12) United States Patent
Waldner et al.

(10) Patent No.: US 7,547,056 B2
(45) Date of Patent: Jun. 16, 2009

(54) SWING AND FOLD DOWN TAILGATE ACTIONING MECHANISM

(75) Inventors: Miguel Waldner, Troy, MI (US); Herbert Gruber, Rochester Hills, MI (US); Rich Boatright, Houghton Lake, MI (US)

(73) Assignee: Magna International (CA)

( * ) Notice: Subject to any disclaimer, the term of this patent is extended or adjusted under 35 U.S.C. 154(b) by 119 days.

(21) Appl. No.: 11/784,891

(22) Filed: Apr. 10, 2007

(65) Prior Publication Data
US 2008/0252092 A1    Oct. 16, 2008

(51) Int. Cl.
*B62D 33/037* (2006.01)
(52) U.S. Cl. .................. 296/57.1; 16/231; 292/DIG. 43
(58) Field of Classification Search ............... 296/57.1, 296/50, 146.11, 146.12; 292/DIG. 29, DIG. 43, 292/216, 201, 336.3; 16/231, 308, 334, 367; 70/279
See application file for complete search history.

(56) References Cited

U.S. PATENT DOCUMENTS

| 3,592,504 | A | 7/1971 | Sandor |
| 4,143,904 | A | 3/1979 | Cooper et al. |
| 2006/0001288 | A1 | 1/2006 | Thiele et al. |

*Primary Examiner*—Joseph D Pape
(74) *Attorney, Agent, or Firm*—Warn Partners, P.C.; Marc Luddy (57) ABSTRACT

The present invention is a swing and fold down tailgate mechanism which includes an inner panel, a first handle supported by the inner panel operably associated with a first latch and a second latch, a second handle supported by the inner panel operably associated with the first handle and a third latch. The present invention also includes a hinge member operably associated with the first handle and the second handle for providing hinged support of the tailgate such that the tailgate pivots in a drop down direction and alternatively in a swing open direction. When the first handle is actuated, the first and second latch will release and the second handle will be deactivated, allowing the tailgate to pivot using the third latch and hinge. When the second handle is actuated, the second and latch will release and the first handle will be deactivated, allowing the tailgate to pivot about the first latch and hinge.

20 Claims, 12 Drawing Sheets

SWING AND FOLD DOWN TAILGATE ACTIONING MECHANISM

FIELD OF THE INVENTION

The present invention relates to tailgates and their use with pickup trucks and sport utility vehicles. More particularly, the present invention relates to tailgates having the ability to fold down in the same manner as a common tailgate, as well as swing open about a vertical pivot axis.

BACKGROUND OF THE INVENTION

The use of tailgates in pickup trucks and sport utility vehicles is widely known. Tailgates used with pickup trucks often have the ability to fold down to allow for easier access to the bed of the pickup truck. These types of tailgates often incorporate a single handle in the middle of the tailgate, which is used to release two latches, allowing the tailgate to open. Tailgates used with sport utility vehicles often have the same ability to swing down in the same manner as tailgates used for pickup trucks. Additionally, some tailgates used with sport utility vehicles are commonly structured to swing open such that the tailgate pivots about a vertical axis which can be located on either side of the tailgate. However, most tailgates do not incorporate the concept of being able to fold down as with a typical tailgate used in a pickup truck, as well as being able to swing open about a vertical axis, which is the type of tailgate commonly used in sport utility vehicles. Incorporating the ability of the tailgate to fold downward as with a conventional pickup truck as well as being able to swing open as commonly used with sport utility vehicles would greatly increase the ability for the user to access the rear of the vehicle.

Accordingly, there exists a need for a tailgate having the ability to fold down in the same manner as a conventional tailgate used with pickup trucks, as well as swing open about a vertical axis in a similar manner to tailgates commonly used in sport utility vehicles.

SUMMARY OF THE INVENTION

The present invention is a swing and fold down tailgate actioning mechanism having a tailgate which includes an inner panel, a first handle supported by the inner panel operably associated with a first latch and a second latch, and a second handle supported by the inner panel operably associated with the first handle and a third latch. The present invention also includes a hinge member operably associated with the first handle and the second handle for providing hinged support of the tailgate such that the tailgate pivots in a drop down direction and alternatively in a swing open direction.

When the first handle is actuated, the first latch and the second latch will release and the second handle will be deactivated, allowing the tailgate to pivot using the third latch and the hinge. When the second handle is actuated, the second latch and third latch will release and the first handle will be deactivated, allowing the tailgate to pivot about the first latch and the hinge.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

A tailgate having a swing and fold down tailgate actioning mechanism according to the present invention is shown in FIGS. 1-3, 8a and 8b at 10. The tailgate 10 has a first handle 12 for allowing the tailgate 10 to have a fold down mode of operation and a second handle 14 for allowing the tailgate 10 to have a swing open mode of operation.

Referring to the Figures, first handle 12 is connected to a first latch 16 and a second latch 18. The first handle 12 is connected to the first latch 16 through the use of a first dual-action cable rod 20, and to the second latch 18 through the use of a single-action cable rod 22. The first handle 12 has a lever 24 which pivots about a first axis 26, and a handle lever 28 which pivots about a second axis 30. The handle lever 28 also has a slot 32 which is used for slidably receiving a first handle lock 34. The first handle lock 34 has a slot 36 which slides on a pin 38; the pin 38 is affixed to the handle lever 28. The first handle lock 34 also includes a raised portion 40 which can be selectively in contact with a shoulder 42 of the lever 24. The handle lock 34 also has an extension 44 which is connected to a first idle feedback rod 46. The handle lever 28 is connected to a second idle feedback rod 48 through a pin 50 that is inserted through an aperture 52 in the handle lever 28.

The second handle 14 is constructed in similar fashion to the first handle 12. The second handle 14 also includes a handle lever 54 which has a slot 56 for receiving a second handle lock 58. The second handle lock 58 also has a slot 60 which slides on a pin 62 on the handle lever 54, and a raised portion 66 which can be selectively in contact with a shoulder 68 on a lever 70. The lever 70 rotates on a third axis 72 to actuate the second handle 14, and the handle lever 54 along with the handle lock 58 rotate on a fourth axis 74 when the second handle 14 is actuated. The first idle feedback rod 46 is connected to the handle lever 54 in the same manner as the second idle feedback rod 48 is connected to the handle lever 28. The second idle feedback rod 48 is connected to an extension 76 on the second handle lock 58. The handle lever 54 is also connected to a second dual action cable rod 78 which is connected to a third latch 80. The single action cable rod 22 also includes a cylinder 82 which is moved by a first elbowed-flange 84. The first elbowed-flange 84 also has a hole (not shown) which allows the single action cable rod 22, but not the cylinder 82, to slide through the first elbowed-flange 84, the purpose of which will be described later.

The handle lever 54 also includes a second elbowed-flange 86 having a hole (not shown) for supporting a first ball member 88. The first ball member 88 is connected to one end of the second dual action cable rod 78. The handle lever 28 has a third elbowed-flange 90 for supporting a second ball member 92; the third elbowed-flange 90 also has a hole (not shown) for allowing the first dual-action cable rod 20 to pass through the hole and connect to the second ball member 92. The handle lever 28 also has a fourth elbowed-flange 94 for supporting a third ball member 96 connected to an end of the single action cable rod 22. The fourth elbowed-flange 94 also has a hole not shown which allows the single action cable rod 22 to pass through and connect to the third ball member 96.

The first dual action cable rod 20, the single action cable rod 22, and the second dual action cable rod 78 all slide through different brackets 98 and sleeves 100. Each of the brackets 98 and sleeves 100 serve the same purpose, and therefore the function of which will be described together. The brackets 98 are attached to an inner panel 102 of the tailgate 10, this allows the brackets 98 and the sleeves 100 to define a path for the first dual action cable rod 20, the single action cable rod 22, and the second dual action cable rod 78 such that when the first handle 12 or the second handle 14 is actuated, the first dual action cable rod 20, the single action cable rod 22, or the second dual action cable rod 78 will be forced to actuate either the first latch 16, the second latch 18, or the third latch 80, depending upon the mode of operation.

The inner panel 102 also includes a first pillar 103 which is connected to the second latch 18, and a second pillar 105 which is connected to the first latch 16 and the third latch 80. The inner panel 102 also supports an outer panel 107 which is used to provide an aesthetically pleasing appearance and typically matches the paint scheme of the vehicle, and a cap 109.

The first latch 16, the second latch 18, and the third latch 80 all have similar geometry and components, and therefore will be described together. One notable difference is that the first latch 16 is connected to the first dual action cable rod 20, the second latch 18 being connected to the single action cable rod 22, and the third latch 80 is connected to the second dual action cable rod 78. Another difference is that the third latch 80 has some additional components which will be described later.

Figure 1:
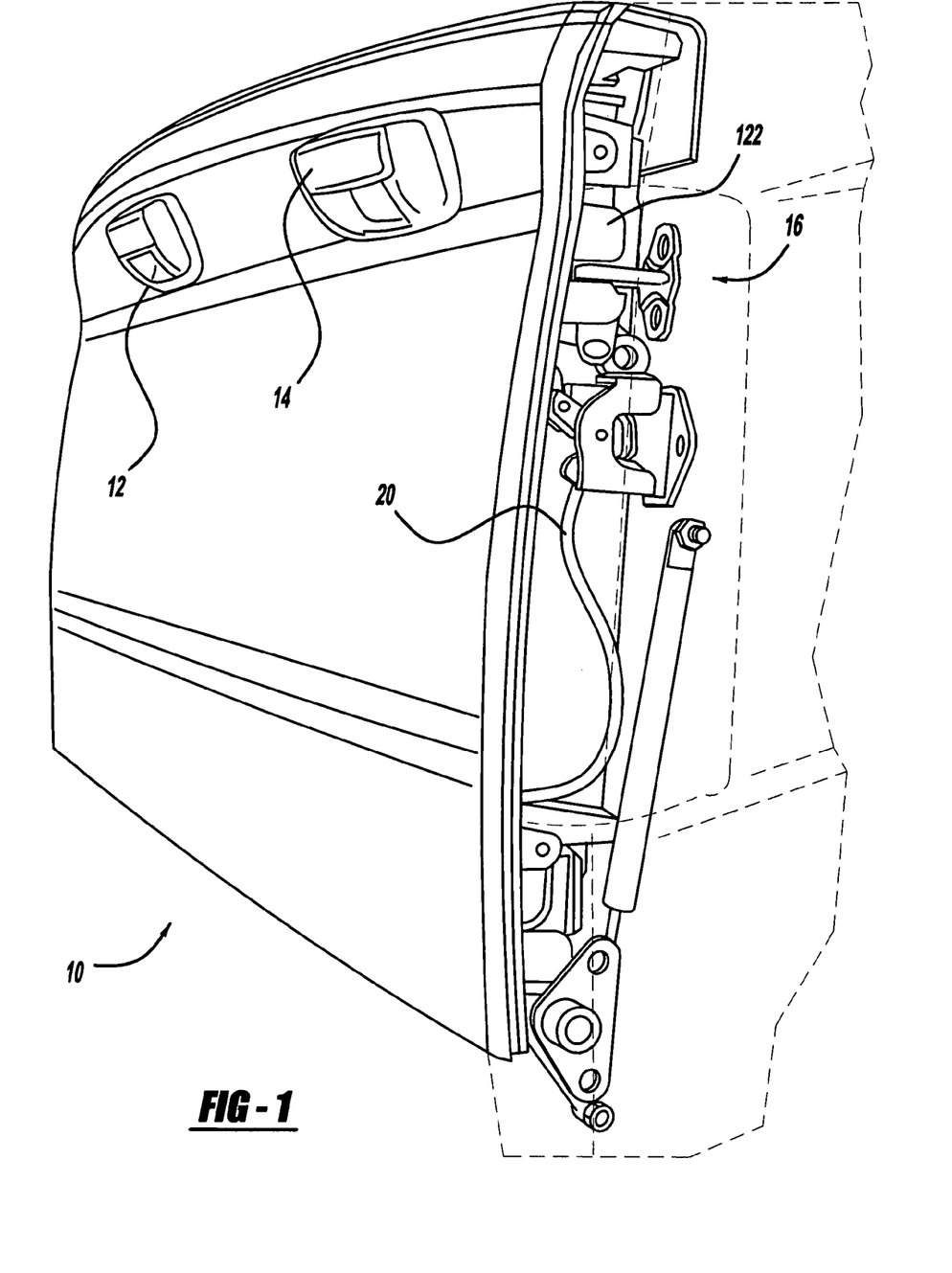
FIG. 1 is a perspective view of a tailgate having a tailgate actioning mechanism, according to the present invention.
Figure 2:
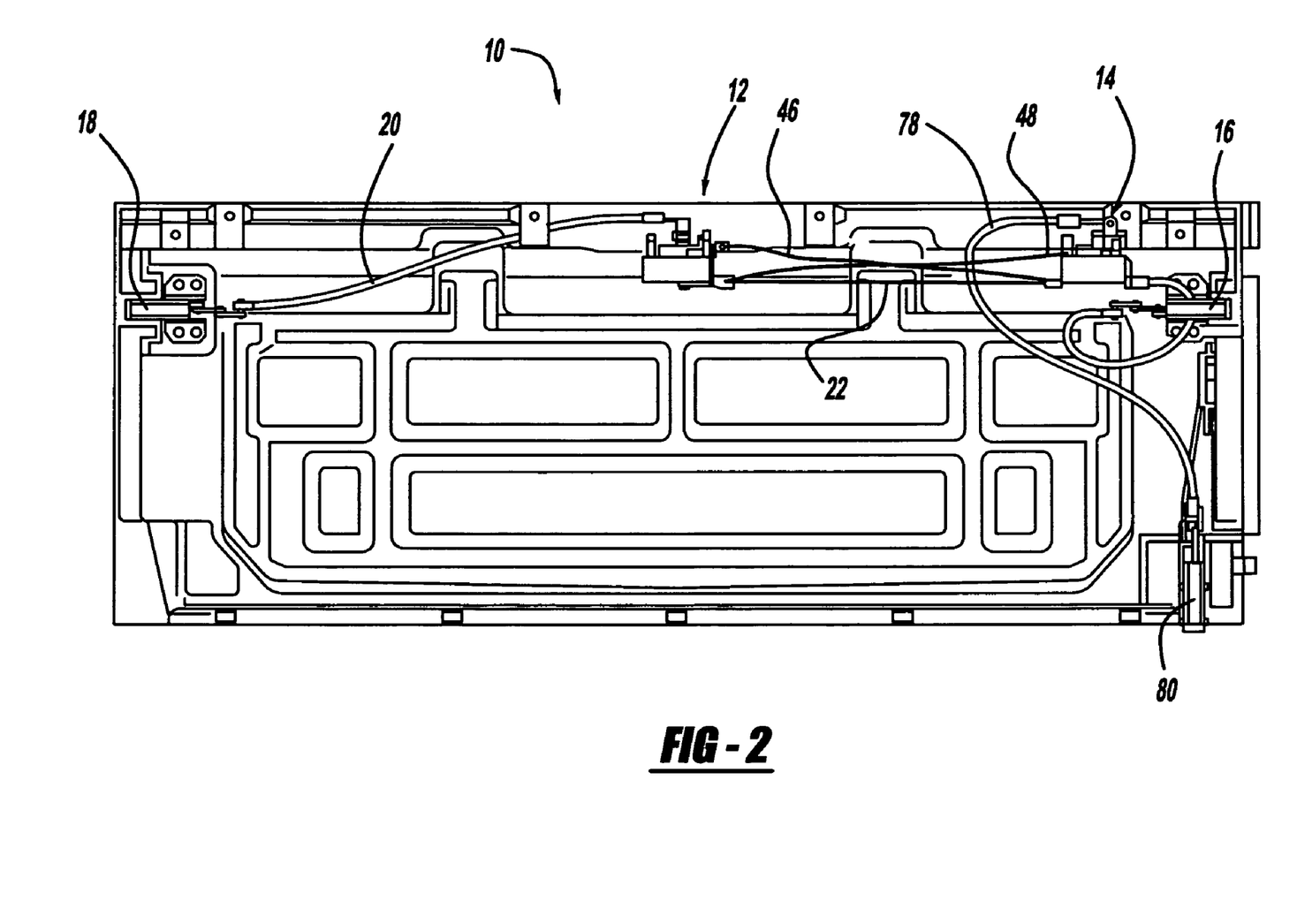
FIG. 2 is a rear view of the inner panel of a tailgate having a tailgate actioning mechanism, according to the present invention.
Figure 3:
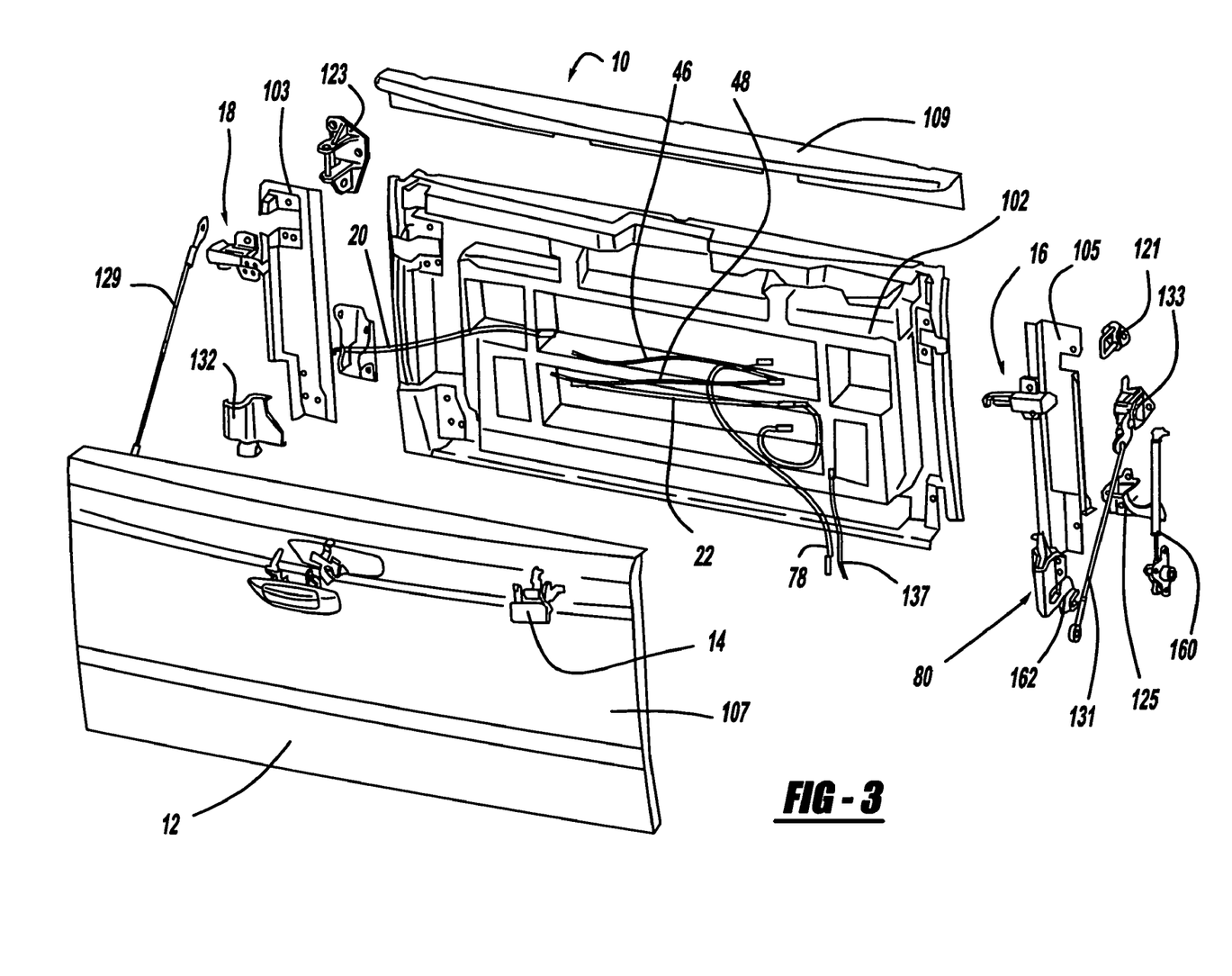
FIG. 3 is an exploded view of a tailgate having a tailgate actioning mechanism, according to the present invention.
Figure 4A:
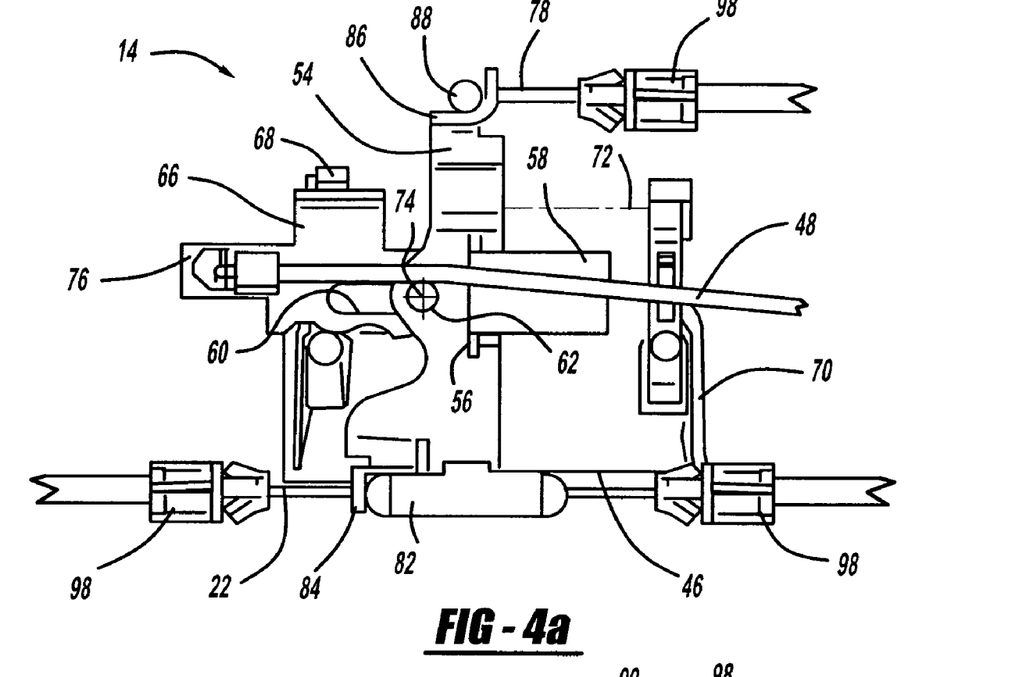
FIG. 4a is a front view of a second handle of a tailgate actioning mechanism, according to the present invention.
Figure 4B:
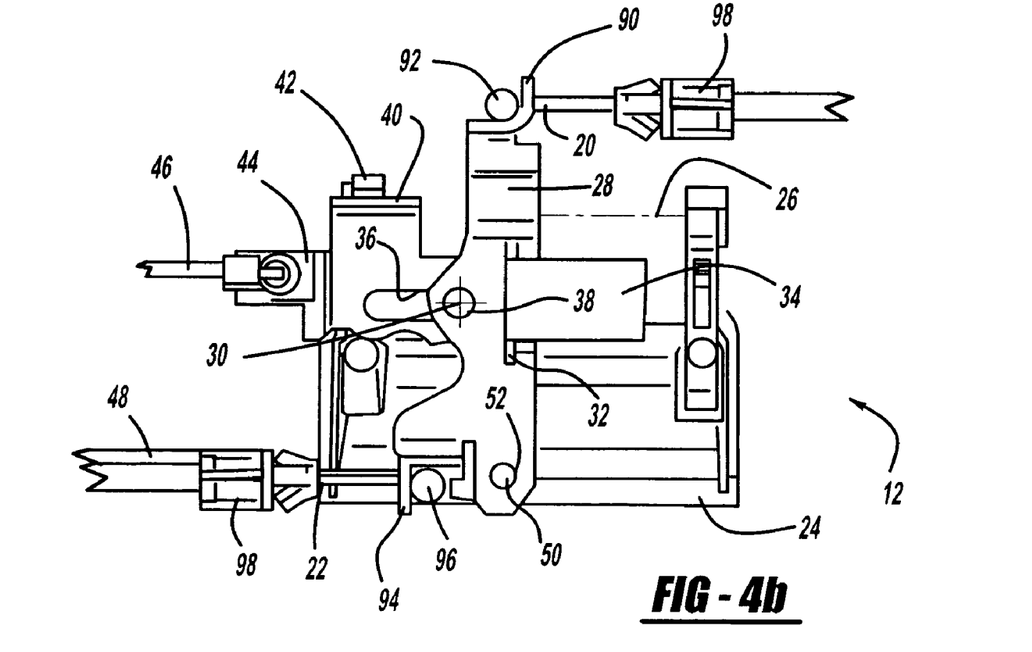
FIG. 4b is a front view of a first handle used in a tailgate actioning mechanism, according to the present invention.
Figure 4C:
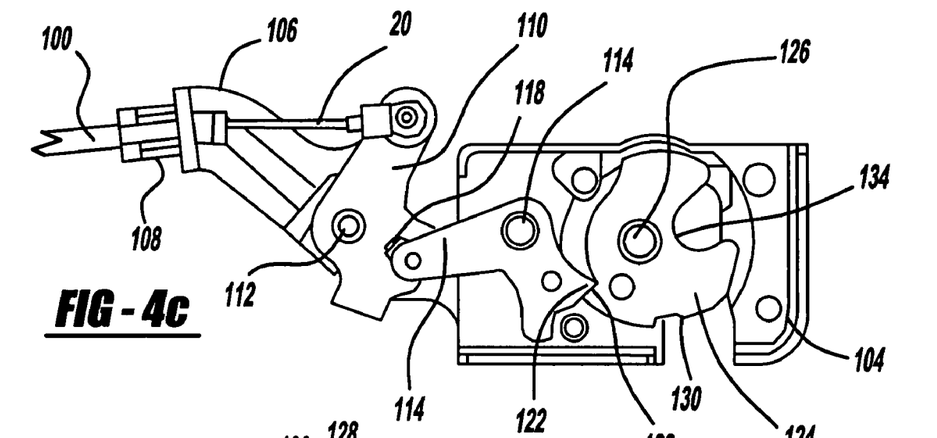
FIG. 4c is a top view of a first latch used in a tailgate actioning mechanism, according to the present invention.
Figures 4D, 4E:
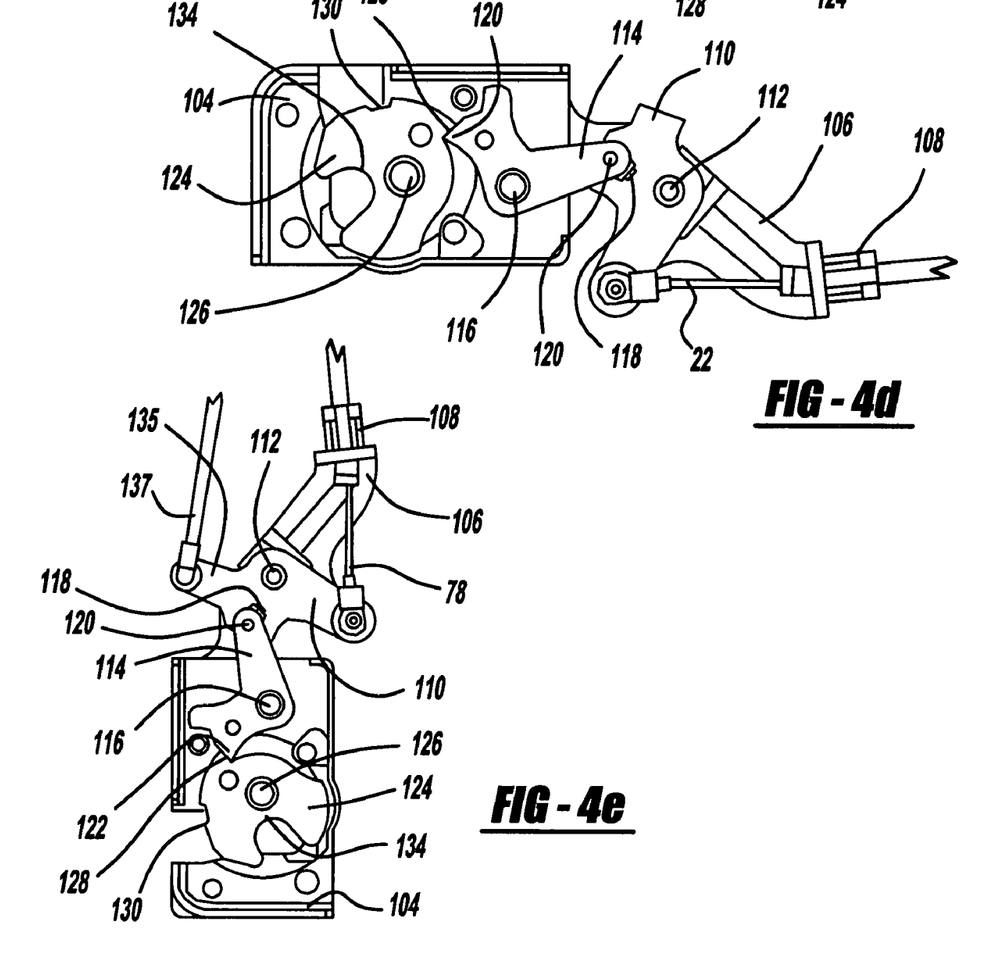
FIG. 4d is a top view of a second latch used in a tailgate actioning mechanism, according to the present invention.
FIG. 4e is a side view of a third latch used in a tailgate actioning mechanism, according to the present invention.
Figure 6A:
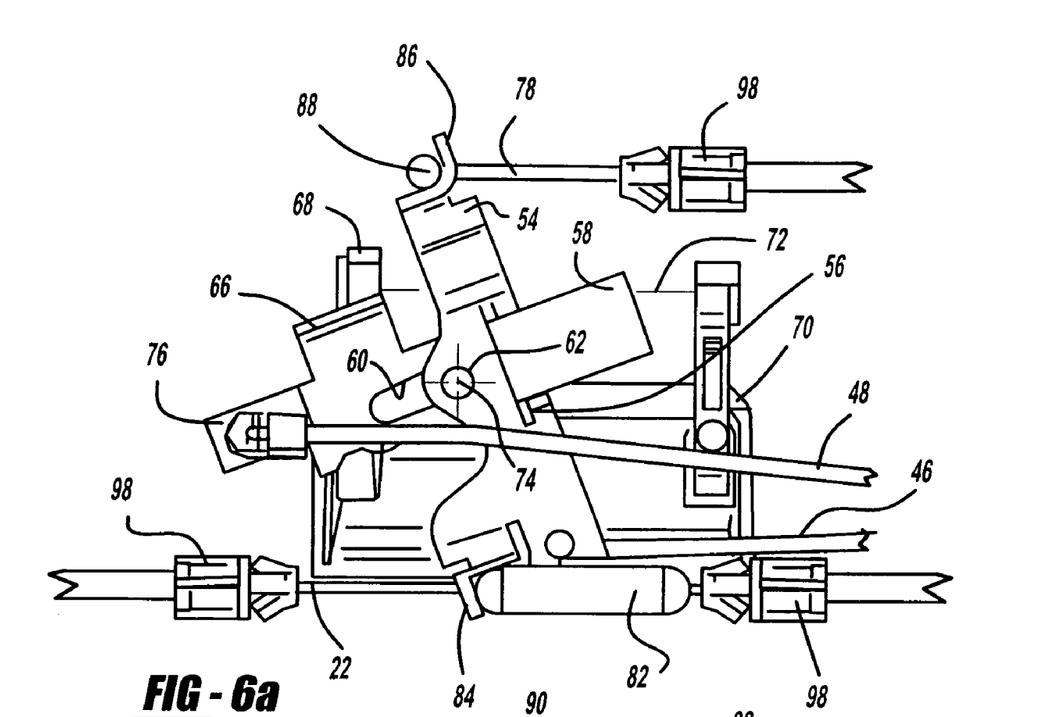
FIG. 6a is a front view of a second handle in an open position used in a tailgate actioning mechanism, according to the present invention.
Figure 6B:
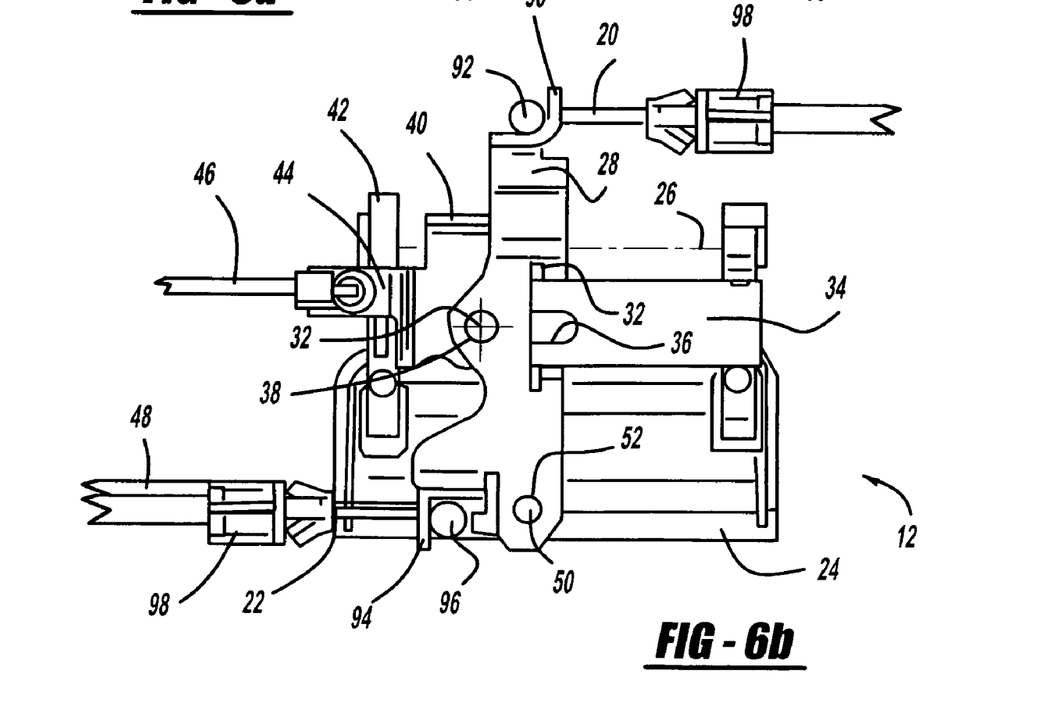
FIG. 6b is a front view of a first handle in a closed position used in a tailgate actioning mechanism, according to the present invention.
Figure 6C:
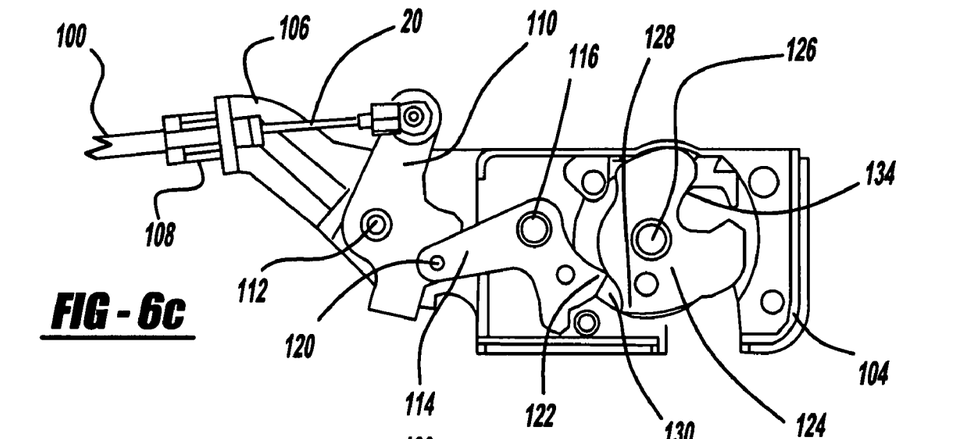
FIG. 6c is a top view of a first latch in a closed position used in a tailgate actioning mechanism, according to the present invention.
Figures 6D, 6E:
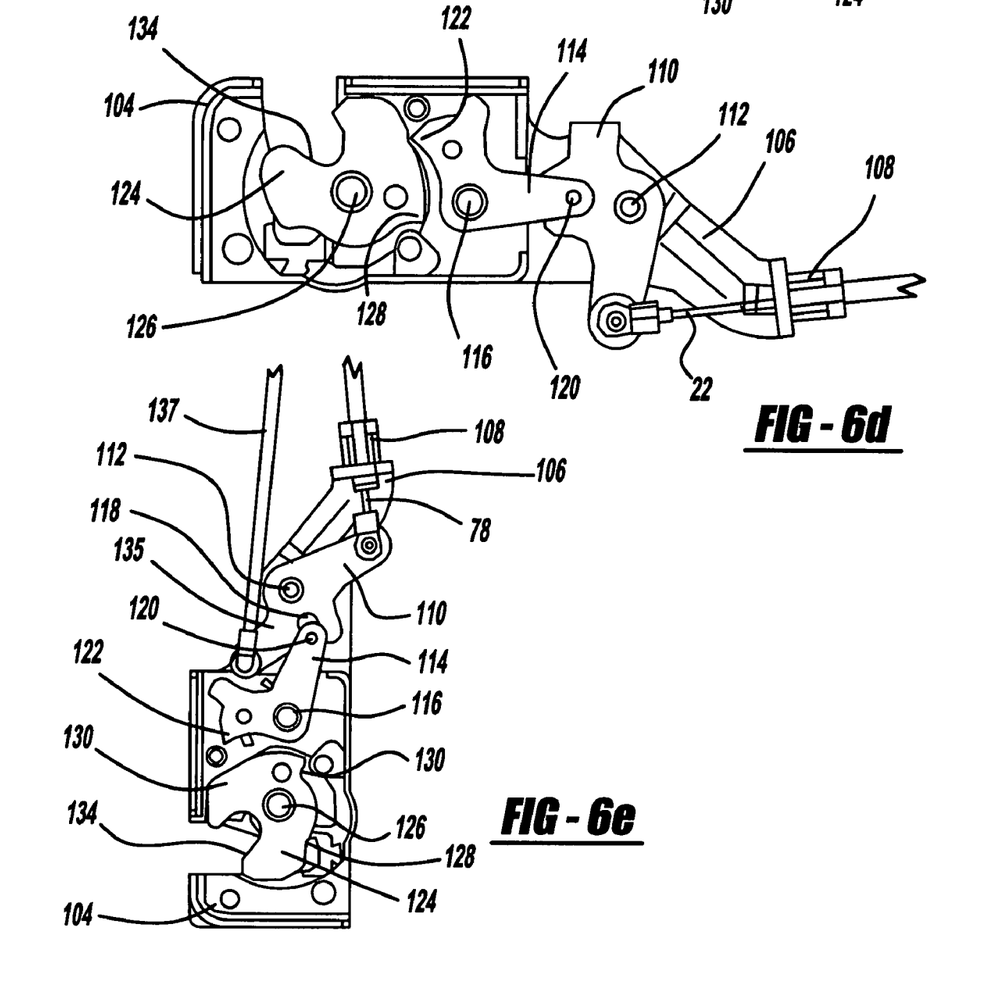
FIG. 6d is a top view of a second latch in an open position used in a tailgate actioning mechanism, according to the present invention.
FIG. 6e is a side view of a third latch in an open position used in a tailgate actioning mechanism, according to the present invention.

The first latch 16 has a frame member 104 which has an arm member 106 having a bracket 108 connected to a sleeve 100. The first dual action cable rod 20 is able to slide through the bracket 108 and is connected to a first pivot member 110. The first pivot member 110 is connected to the frame member 104 through the use of a typical rivet 112; the rivet 112 allows the first pivot member 110 to pivot about the rivet 112. Also connected to the frame member 104 is a second pivot member 114. The second pivot member 114 is also connected to the frame member 104 by the use of a rivet 116, and the rivet 116 allows the second pivot member 114 to rotate about the rivet 116. A spring (not shown) surrounds the rivet and is connected to the frame member 104 and the second pivot member 114. The spring is used to bias the second pivot member 114 to the positions shown in FIGS. 4c and 6c. The first pivot member 110 also has a slot 118 for slidably receiving a pin 120 on the second pivot member 114. The second pivot member 114 also has a pointed edge 122.

The first latch 16 also has a third pivot member 124, which is also connected to the frame member 104 through a rivet 126, with the rivet 126 allowing for rotation of the third pivot member 124. Located about the rivet 126 is a spring (not shown) which is connected to the frame member 104 and the third pivot member 124. The spring is used to bias the third pivot member 124 in the positions shown in FIGS. 4c and 6c. The third pivot member 124 also includes two notches 128 and 130 for receiving the pointed edge 122.

The third pivot member 124 of the first latch 16 is used with a first striker 121, the third pivot member 124 of the second latch 18 is used with a second striker 123, and the third pivot member 124 of the third latch 80 is used with a third striker 125. The first striker 121 is used for holding the tailgate 10 in a closed position; the second striker 123 is used to hold the tailgate 10 in a closed position and provide a pivot point when the tailgate 10 is being used in a swing open mode of operation; and the third striker 125 is used for holding the tailgate 10 in a closed position, as well as providing a pivot point when the tailgate 10 is being used in a dropdown mode of operation. The second striker 123 and third striker 125 are of more robust construction as compared to the first striker 121. The reason for this is that the second striker 123 and the third striker 125 are used for providing pivot points, where the first striker 121 is used for holding the tailgate 10 in a closed position.

As previously stated, the tailgate 10 has two modes of operation, the first mode is a drop down mode in which the tailgate 10 is used in a similar manner to that of a typical tailgate in a pickup truck or sport utility vehicle. In this mode, the operator will apply force to the lever 24, which will cause the lever 24 to rotate about the first axis 26, and the shoulder 42 to depress the raised portion 40 of the first handle lock 34. As this occurs, the first handle lock 34 and the handle lever 28 will rotate about the second axis 30. The rotation of the handle lever 28 about the second axis 30 will force the third-elbowed flange 90 to pull on the second ball member 92 and therefore the first dual action cable rod 20; this rotation will also cause the fourth elbowed-flange 90 to pull on third ball member 96, and therefore single action cable rod 22. Pulling on the first dual action cable rod 20 and the single action cable rod 22 will release the first latch 16 and the second latch 18.

When the first latch 16 and the second latch 18 are released, the tailgate 10 is able to rotate about the third striker 125 in the third pivot member 122 of the third latch 80, and a universal hinge 132 connected to the first pillar 103, the function of which will be described later. As the first dual action cable rod 20 (and the single action cable rod 22) is pulled, the first pivot member 110 in both the first latch 16 and the second latch 18 will rotate about the rivet 112. Rotation of the first pivot member 110 will in turn cause the pin 120 to slide in the slot 118 and force the second pivot member 114 to rotate as well about the rivet 116. Rotating the second pivot member 114 will cause the pointed edge 122 to lift out of the first notch 128 when the first latch 16, the second latch 18, or the third latch 80 are in a closed position. Once the pointed edge 122 is released from the first notch 128, the spring positioned around the rivet 126 will cause the third pivot member 124 to rotate about the rivet 126 to an open position shown in FIGS. 5c and 5d. The third pivot member 124 also includes a recess 134 which is used for selectively receiving the third striker 125 when the third latch 80 is in a closed position.

Figure 5A:
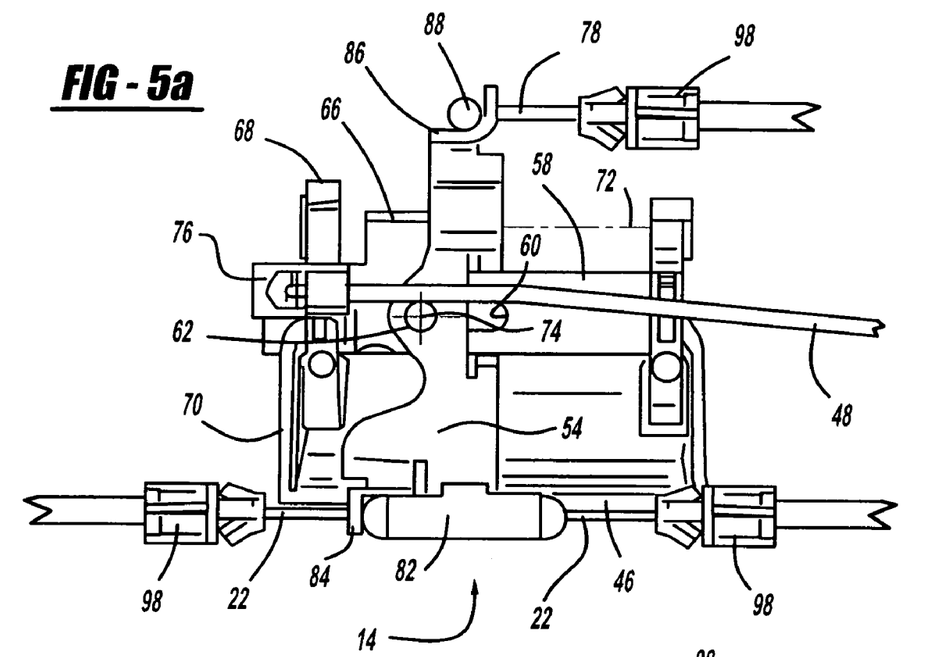
FIG. 5a is a second top view of a second handle used in a tailgate actioning mechanism, according to the present invention.
Figure 5B:
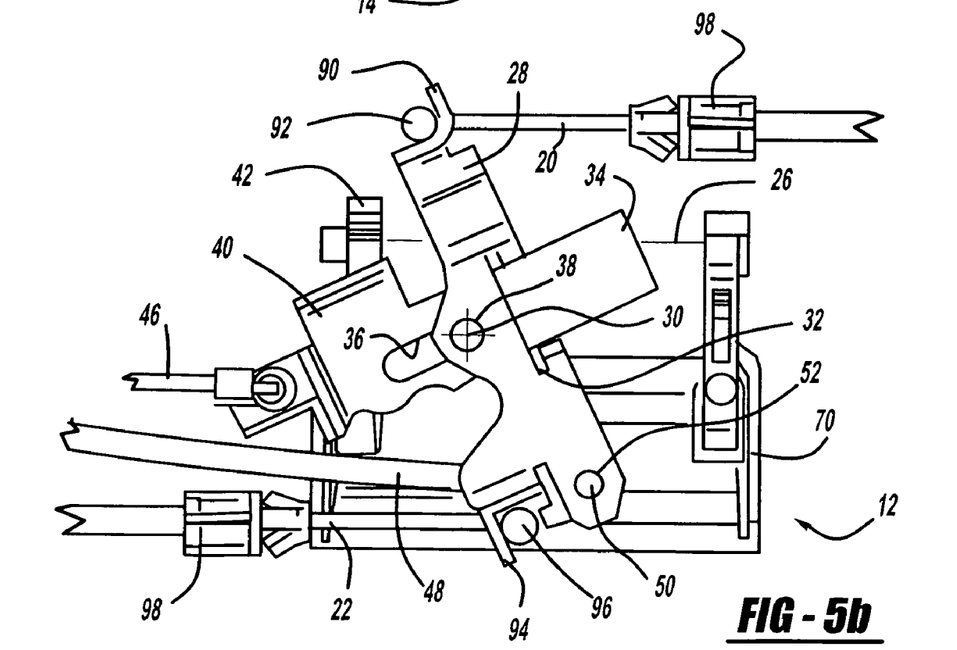
FIG. 5b is a front view of a first handle in an open position used in a tailgate actioning mechanism, according to the present invention.
Figure 5C:
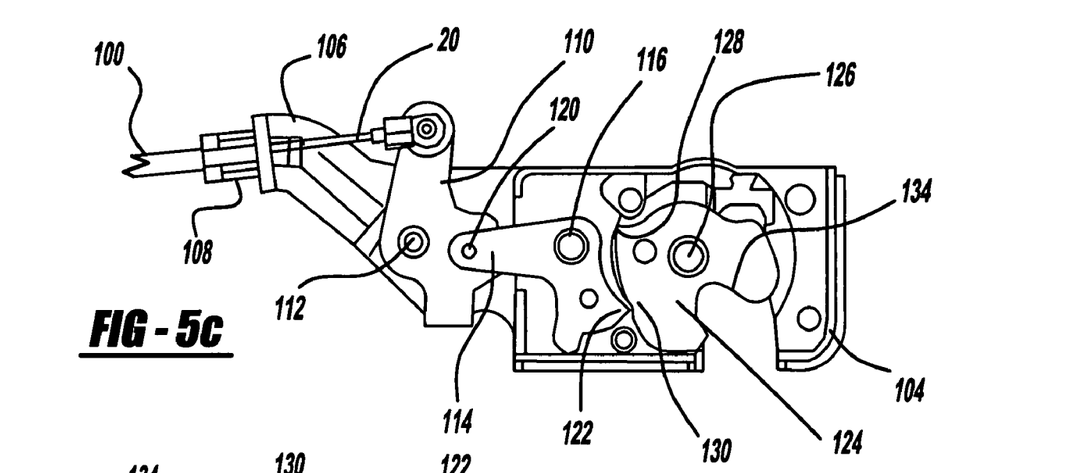
FIG. 5c is a top view of a first latch in an open position used in a tailgate actioning mechanism, according to the present invention.
Figures 5D, 5E:
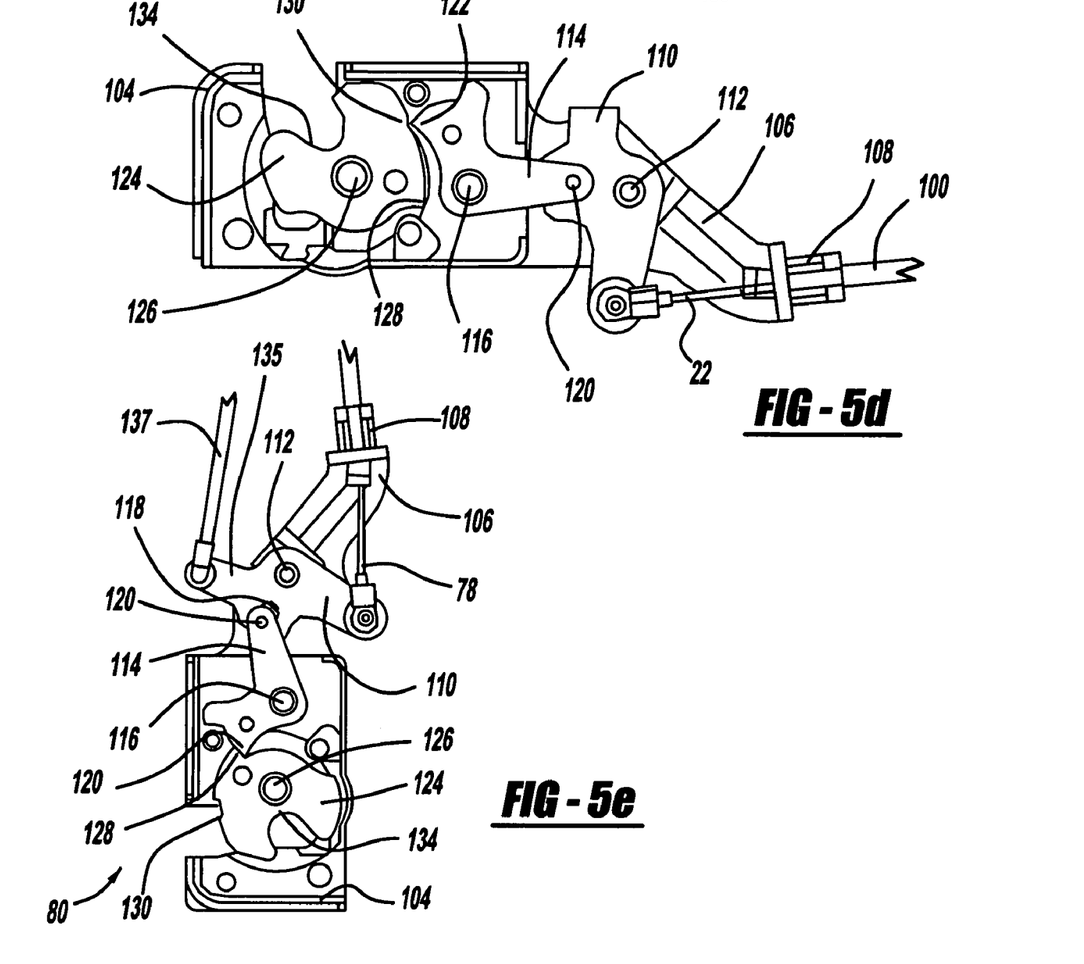
FIG. 5d is a top view of a second latch in an open position used in a tailgate actioning mechanism, according to the present invention.
FIG. 5e is a side view of a third latch in a closed position used in a tailgate actioning mechanism, according to the present invention.

Once the spring has rotated the third pivot member 124 to an open position, the pointed edge 122 will rest in the notch 130, holding the third pivot member 124 in the position shown in FIGS. 5c and 5d until the tailgate 10 is to be moved back into the closed position. Once the tailgate 10 is to be closed, the tailgate 10 will rotate about the universal hinge 132 and the third striker 125; the first latch 16 and the second latch 18 will be moved such that the strikers 121, 123 will cause the third pivot member 124 to rotate about the rivet 126 in the opposite direction compared to when the tailgate 10 is being opened, and the pointed edge 122 will slide along the outer edge of the third pivot member 124 until the pointed edge 122 is placed back into the notch 128, holding the tailgate 10 in a closed position. Once in the closed position, the first striker 121 is held between the recess 134 and the frame member 104 of the first latch 16, and the second striker 123 is held between the recess 134 and the frame member 104 of the second latch 18.

The tailgate 10 of the present invention also includes a first cable 129 and a second cable 131. The cables 129, 131 are used to limit the rotation of the tailgate 10 to a predetermined amount, based on the length of the cables 129, 131. The first cable 129 is connected to the tailgate 10 and a vehicle in a conventional manner. The second cable 131 includes cable transfer latch 133 connected to the vehicle which is used for disconnecting the second cable 131 when the tailgate 10 is being used in swing mode. The cable transfer latch 133 is necessary because the tailgate 10 would not otherwise be able to open fully when the tailgate 10 is being used in swing mode. The third latch 80 is also includes an extra extension 135 which is part of the first pivot member 110 of the third latch 80. The extra extension 135 is connected to load cable transfer system rod 137 which activates the cable transfer latch 133 to release the second cable 131 from the vehicle and cause the second cable 131 to remain connected to the tailgate 10. When the tailgate 10 is being used in drop down mode, one end of the second cable 131, connected to the cable transfer latch 133, will remain connected to the vehicle.

To actuate the tailgate 10 in the second mode of operation, referred to as swing mode, the lever 70 of the second handle 14 is rotated about the third axis 72 by the operator. This forces the shoulder 68 on the lever 70 to apply force to the raised portion 66 of the second handle lock 58, which in turn causes the second handle lock 58 and the handle lever 54 to rotate about the fourth axis 74. When the handle lever 54 rotates, the second elbowed-flange 86 will apply force to the first ball member 88 pulling on the second dual action cable rod 78, and the first elbowed flange 84 will apply force to the cylinder 82, pulling on the single action cable rod 22. Pulling on the second dual action cable rod 78 and the single action cable rod 22 will release the third latch 80 and the second latch 18, respectively, while the first latch 16 will remain closed. This will allow the tailgate 10 to swing open, and pivot about the universal hinge 132 and the first striker 121 in the third pivot member 122 of the first latch 16.

When the tailgate 10 is being used in drop down mode, second idle feedback rod 48 will pull on the second handle lock 58 as the first handle lock 34 and the handle lever 28 are rotated about the second axis 30. The second handle lock 58 will slide through the slot 82 such that the raised portion 66 will no longer be in contact with the shoulder 68 of the lever 70. When this occurs, the second handle 14 will be in an "idle" position and will not be able to actuate the single action cable rod 22 or the second dual action cable rod 78.

Conversely, when the tailgate 10 is being used in swing mode, first idle feedback rod 46 will push on the first handle lock 34 as the handle lever 54 and the second handle lock 58 are rotated about the fourth axis 74. The first handle lock 34 will slide through the slot 32 such that the raised portion 40 will no longer be in contact with the shoulder 42 of the lever 24. When this occurs, the first handle 12 will then be in an "idle" position and will not be able to actuate the single action cable rod 22 or the first dual action cable rod 20.

The reason for the idle positions of the first handle 12 and the second handle 14 is that when the tailgate 10 is used in one of the aforementioned modes of operation, if both handles 12,14 were actuatable, it would be possible to accidentally release the first latch 16, the second latch 18, and the third latch 80 all at the same time, possibly causing damage to the tailgate 10, or more specifically the universal hinge 132. If the handles 12, 14 were to be rigid, the tendency for the operator would be to pull on the handle 12, 14 with great force, believing the handle 12,14 to be stuck or broken. Attempting to actuate the handle 12, 14 with great force could severely damage the handle 12, 14. Having an idle position for the first handle 12 and the second handle 14 will avoid the user from applying excessive force to the first handle 12 or the second handle 14, avoiding damage to both the first handle 12 and the second handle 14.

Figure 7A:
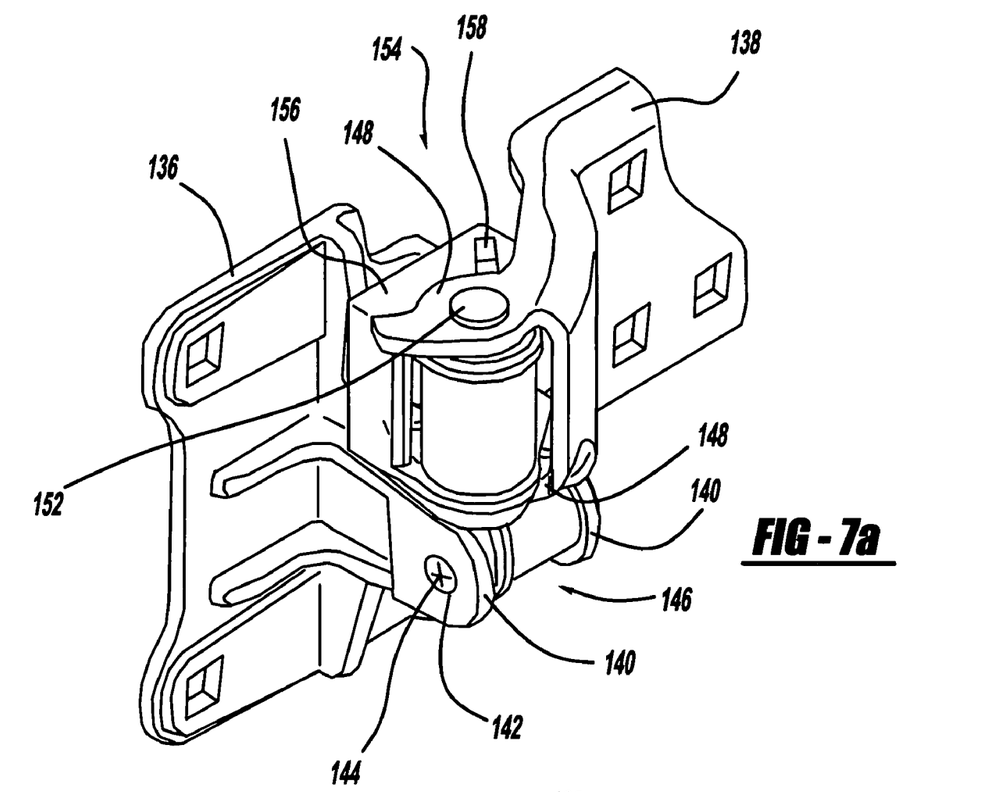
FIG. 7a is a first perspective view of a universal hinge used in a tailgate actioning mechanism, according to the present invention.
Figure 7B:
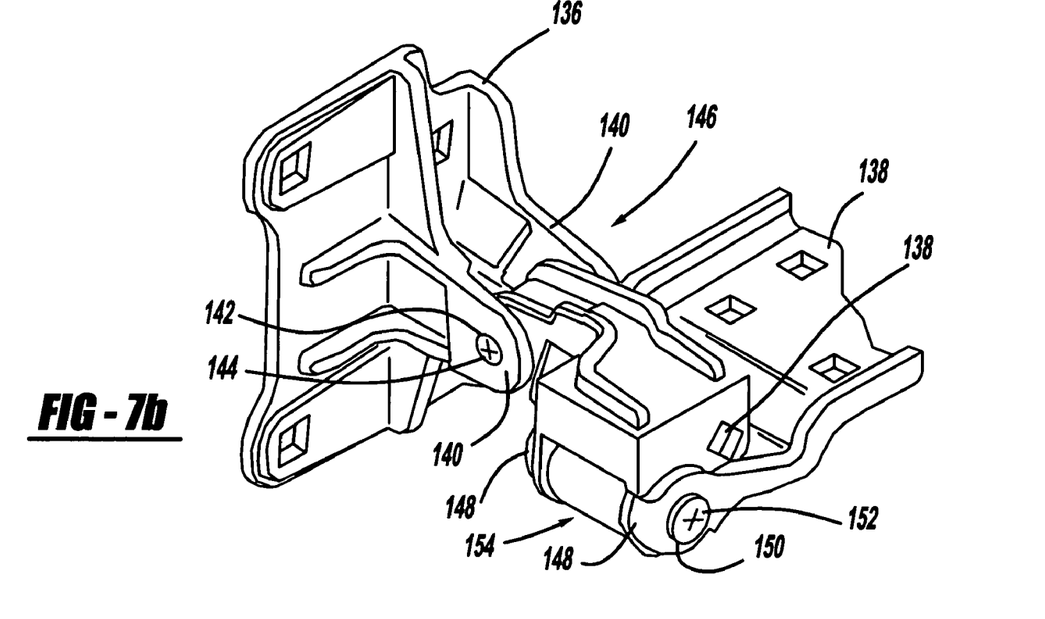
FIG. 7b is a second perspective view of a universal hinge used in a tailgate actioning mechanism folded about a first hinge connection, according to the present invention.
Figure 7C:
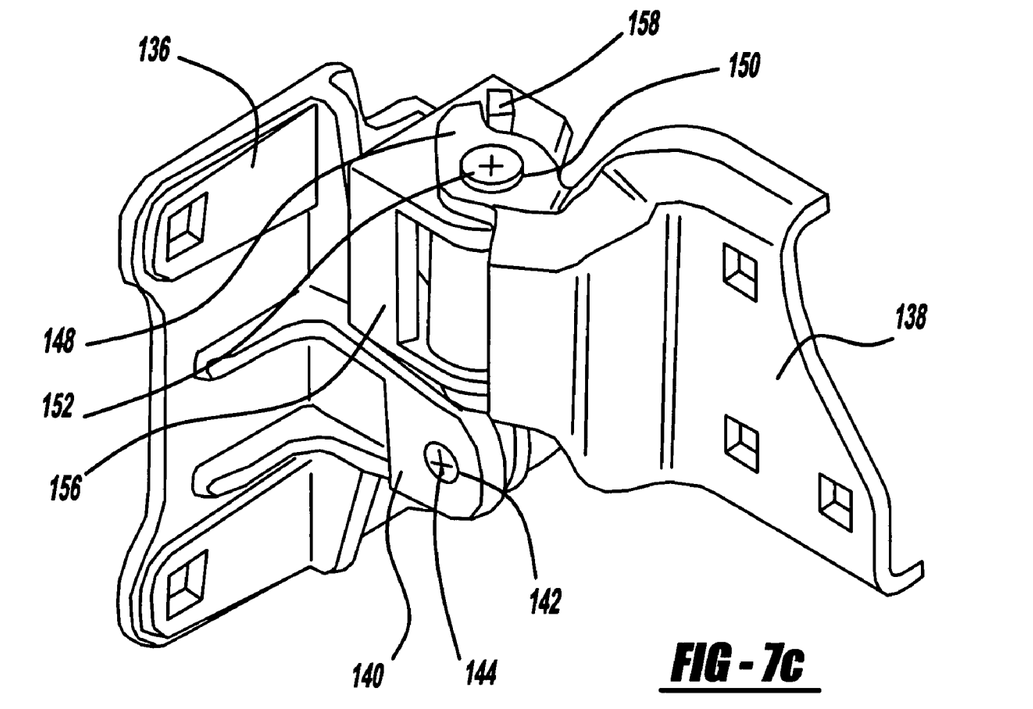
FIG. 7c is a third perspective view of a universal hinge used in a tailgate actioning mechanism folded about a second hinge connection, according to the present invention.

The universal hinge 132 is more clearly shown in FIGS. 7a, 7b, and 7c. The universal hinge 132 includes a first support 136 which can be connected to either the frame of the vehicle where the tailgate 10 is being used, or some other component which is suitable for supporting a tailgate 10 according to the present invention, and a second support 138 which is connected to the inner panel 102 of the tailgate 10. The first support 136 has first set of extensions 140 which have holes 142 for receiving a pin 144 to form a first hinge connection 146 when the tailgate 10 is being used in drop down mode. The second support 138 has a second set of extensions 148 which also have holes 150 for receiving a pin 152 for forming a second hinge connection 154 when the tailgate 10 is being used in swing mode. Connecting the first support 136 and the second support 138 is a joiner 156. The joiner 156 has two cylindrical openings (not shown) for receiving the pin 144 for the first hinge connection 146 and the pin 152 for the second hinge connection 154.

When the tailgate 10 is being used in drop down mode, the universal hinge 132 will be in the position shown in FIG. 7b. The universal hinge 132 will be rotated about the first hinge connection 146; the first hinge connection 146 is also used with the third latch 80 to allow the tailgate 10 to operate in drop down mode. When the tailgate 10 is being used in swing mode, the universal hinge 132 will be in the position shown in FIG. 7c. In this mode, the tailgate 10 will be rotated about the second hinge connection 154, and the tailgate 10 will pivot about the second hinge connection 154 of the universal hinge 132 and the first latch 16. When the tailgate 10 is used in swing mode, the amount of travel for the tailgate 10 is limited by a stopping mechanism 158 pressing against one of the second set of extensions 148. Movement of the tailgate 10 is limited when the tailgate 10 is in drop down mode by the tailgate cables 129, 131.

Another feature of the tailgate 10 is the presence of a lift assist mechanism 160 which is connected to the vehicle and the tailgate 10 for providing assistance when the tailgate 10 is to be opened or closed. The lift assist mechanism 160 is selectively connected to the third latch 80 through the use of a side bracket 162. The lift assist mechanism 160 will dampen the movement of the tailgate 10, assisting the operator when opening and closing the tailgate 10.

Figure 8A:
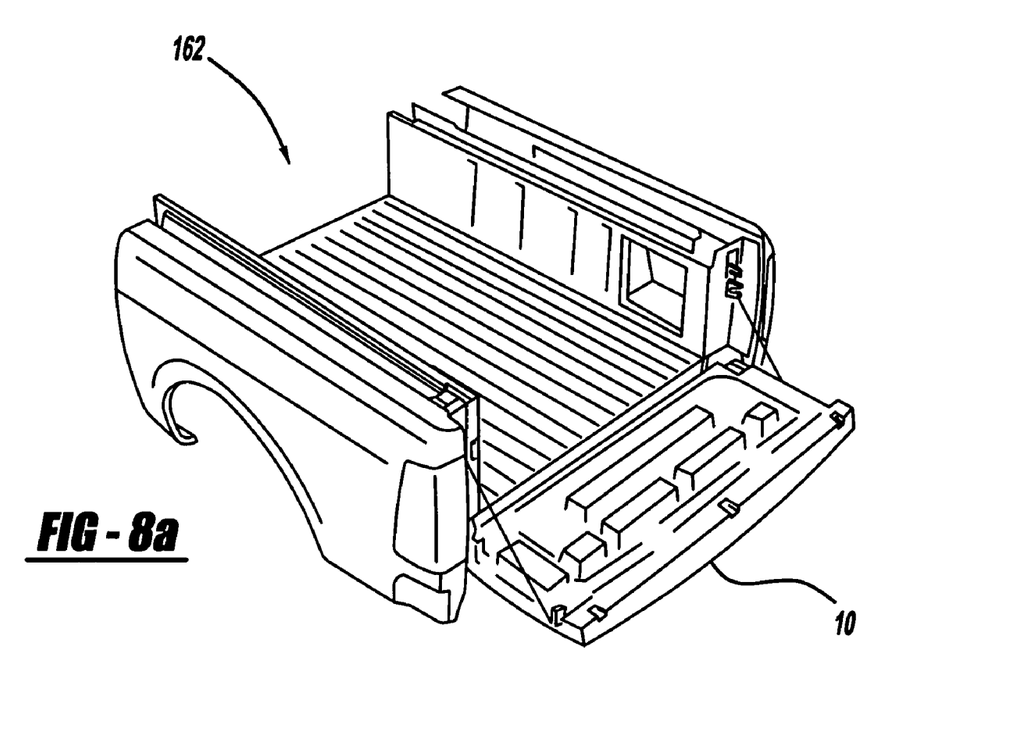
FIG. 8a is a perspective view of a pickup bed having a tailgate in a folded down position, according to the present invention.
Figure 8B:
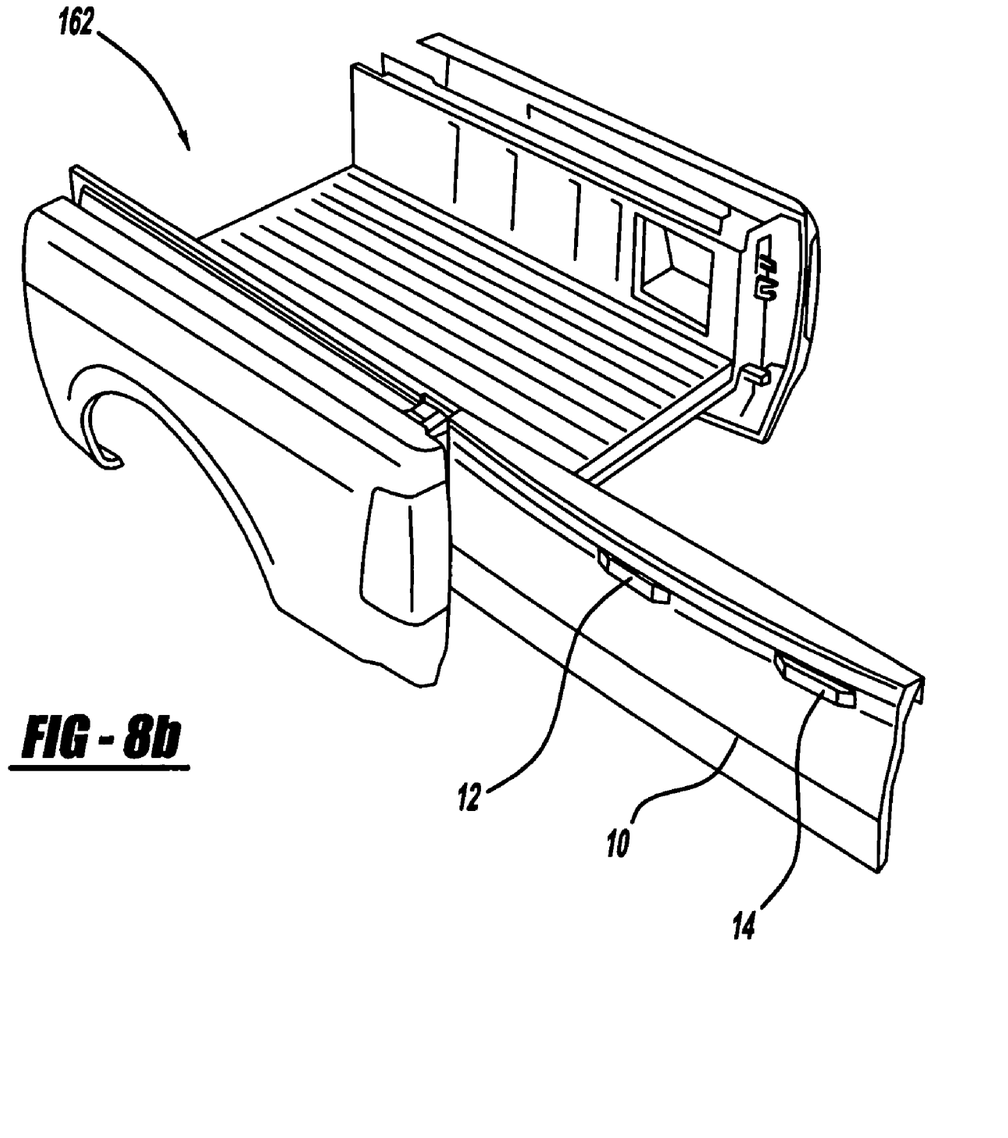
FIG. 8b is a perspective view of a pickup bed having a tailgate in a swing open position, according to the present invention.

Referring to FIGS. 8a and 8b, the tailgate 10 is shown along with the bed, generally shown at 162 of a pickup truck in the drop-down mode in FIG. 8a, and in the swing open mode shown in FIG. 8b. It should be noted that the tailgate 10 of the present invention is not limited to use with pickup trucks, but the tailgate 10 can also be used with sport utility vehicles as well.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A swing and fold down tailgate actioning mechanism, comprising:
   a tailgate having an inner panel;
   a first handle supported by said inner panel, operably associated with a first latch and a second latch;
   a second handle supported by said inner panel, operably associated with said first handle, and a third latch;
   a hinge member operably associated with said first handle and said second handle for providing hinged support of said tailgate such that said tailgate pivots in a drop down direction and alternatively in a swing open direction; and
   wherein when said first handle is actuated, said first latch and said second latch will release, and said second handle will be deactivated, allowing said tailgate to pivot using said third latch and said hinge member, and when said second handle is actuated, said second latch and said third latch will release and said first handle will be deactivated, allowing said tailgate to pivot about said first latch and said hinge member;
   said first handle having a lever pivotable about a first axis, a handle lever, and a first handle lock slidably received in a slot in said handle lever, said handle lever and said first handle lock pivotable about a second axis;
   said second handle having a lever pivotable about a third axis, a handle lever, and a second handle lock slidably received in a slot in said handle lever, said handle lever and said first handle pivotable about a fourth axis;
   said lever of said first handle further comprising a shoulder selectively in contact with a raised portion of said first handle lock;
   said lever of said second handle further comprising a shoulder selectively in contact with a raised portion of said second handle lock;
   a first idle feedback rod connected to said first handle lock and said handle lever of said second handle;
   a second idle feedback rod connected to said second handle lock and said handle lever of said first handle;
   wherein when said lever of said first handle is rotated about said first axis, said shoulder of said lever of said first handle will apply force to said raised portion of said first handle lock, causing said first handle lock and said handle lever of said first handle to rotate about said second axis and said second idle feedback rod to slide said second handle lock in said slot of said handle lever of said second handle, and when said lever of said second handle is rotated about said third axis, said shoulder of said lever of said second handle will apply force to said raised portion of said second handle lock, causing said second handle lock and said handle lever of said second handle to rotate about said fourth axis and said first idle feed back rod to slide said first handle lock in said slot of said handle lever of said first handle.

2. The mechanism of claim 1, wherein when said second idle feedback rod slides said second handle lock in said slot of said handle lever of said second handle, said shoulder of said lever of said second handle cannot apply force to said raised portion of said second handle lock, causing said second handle to be in an idle position.

3. The mechanism of claim 1, wherein when said first idle feedback rod slides said first handle lock in said slot of said handle lever of said first handle, said shoulder of said lever of said first handle cannot apply force to said raised portion of said first handle lock, causing said first handle to be in an idle position.

4. The mechanism of claim 1, wherein said handle lever of said first handle is connected to said first latch with a first dual action cable rod, and connected to said second latch with a single action cable rod, such that when said handle lever of said first handle is rotated about said first axis said first dual action cable rod will release said first latch, said single action cable rod will release said second latch, and said tailgate will pivot about said hinge member and said third latch.

5. The mechanism of claim 1, wherein said handle lever of said second handle is connected to said third latch with a second dual action cable rod, and connected to said second latch with said single dual action cable rod, such that when said handle lever of said second handle is rotated about third axis said second dual action cable rod will release said third latch and said single action cable rod will actuate said second latch, and said tailgate will pivot about said hinge member and said first latch.

6. The mechanism of claim 1, wherein said hinge member is further comprised of:
- a first support having a first set of extensions, said first set of extensions having a set of holes;
- a second support having a second set of extensions, said second set of extensions having a set of holes, and said second support connected to said tailgate;
- a joiner operably associated with said first support and said second support;
- a first pin inserted through said holes of said first set of extensions and said joiner to form a first hinge connection;
- a second pin inserted through said holes of said second set of extensions and said joiner to form a second hinge connection; and
- wherein when said tailgate is pivoted about said hinge member and said first latch, said hinge member will pivot about said first hinge connection, and when said tailgate is pivoted about said hinge member and said third latch, said hinge member will pivot about said second hinge connection.

7. A tailgate actioning mechanism to be used for opening a tailgate in a swing mode and dropdown mode, comprising:
- a tailgate having an inner panel;
- a first handle having a lever pivotable about a first axis, a handle lever having a slot, and a first handle lock having a raised portion for being selectively in contact with a shoulder located on said lever, said first handle lock slidably received in said slot of said handle lever;
- a second handle having a lever pivotable about a second axis, a handle lever having a slot, a second handle lock having a raised portion for being selectively in contact with a shoulder located on said lever, said second handle lock slidably received in said slot of said handle lever, and a cylinder operably associated with said handle lever;
- a first idle feedback rod connected to said first handle lock and said handle lever of said second handle;
- a second idle feedback rod connected to said second handle lock and said handle lever of said first handle;
- a first latch connected to said handle lever of said first handle by a first dual action cable rod, said first latch mounted on said inner panel;
- a second latch connected to said handle lever of said first handle by a single action cable rod, said single action cable rod extending through and connected to said cylinder, said second latch mounted on said inner panel;
- a third latch connected to said handle lever of said second handle by a second dual action cable rod, said third latch mounted on said inner panel;
- a universal hinge connected to said inner panel;
- wherein when said lever of said first handle is rotated about said first axis, said shoulder on said lever of said first handle will apply force to said raised portion of said first handle lock, causing said first handle lock and said handle lever of said first handle to rotate about said third axis, said first dual action cable rod to release said first latch, and said single action cable rod to release said second latch, and when said lever of said second handle is rotated about said third axis, said shoulder of said lever of said second handle will apply force to said raised portion of said second handle lock, causing said handle lever of said second handle and said handle lock to rotate about said fourth axis, said single action cable rod to release said second latch, and said second dual action cable rod to release said third latch.

8. The mechanism of claim 7, wherein when said handle lever of said first handle rotates about said first axis, said second idle feedback rod will cause said second handle lock to slide in said slot of said handle lever of said second handle, and said shoulder of said lever of said second handle will no longer be able to rotate said second handle lock and said handle lever of said second handle about said second axis.

9. The mechanism of claim 7, wherein when said handle lever of said second handle rotates about said third axis, said first idle feedback rod will cause said first handle lock to slide in said slot of said handle lever of said first handle, and said shoulder of said lever of said first handle will no longer be able to rotate said first handle lock and said handle lever of said first handle about said fourth axis.

10. The mechanism of claim 7, wherein said first latch, said second latch, and said third latch are further comprised of:
- a frame member having an arm member;
- a first pivot member rotatably mounted on said frame member;
- a second pivot member rotatably mounted on said frame member and having a pointed edge, operably associated with said first pivot member;
- a third pivot member rotatably mounted on said frame member having at least two notches and a recess, said third pivot member operably associated with said second pivot member;
- a spring operably associated with said third pivot member such that when said pointed edge is positioned in either of said at least two notches, said spring will bias said pointed edge to remain in said either of said at least two notches, until said second pivot member is rotated by said first pivot member;
- a first striker received by said recess of said third pivot member of said first latch;
- a second striker received by said third pivot member of said second latch;
- a third striker received by said third pivot member of said third latch; and
- when said first latch, said second latch, or said third latch is in a closed position, said pointed edge of said second pivot member is positioned in one of said at least two notches, and when said first pivot member is rotated, said second pivot member will also rotate removing said pointed edge from said one of said at least two notches, allowing said third pivot member to rotate to remove said first striker from said first latch, said second striker from said second latch, or said third striker from said third latch.

11. The mechanism of claim 10, wherein said first dual action cable rod is connected to said first pivot member of said first latch, said single action cable rod is connected to said first pivot member of said second latch, and said second dual action cable rod is connected to said first pivot member of said third latch.

12. The mechanism of claim 7, wherein said universal hinge is further comprised of:
- a first support having a first set of extensions, said first set of extensions having a set of holes;
- a second support having a second set of extensions, said second set of extensions having a set of holes, and said second support connected to said tailgate;
- a joiner operably associated with said first support and said second support;
- a first pin inserted through said holes of said first set of extensions and said joiner to form a first hinge connection;

a second pin inserted through said holes of said second set of extensions and said joiner to form a second hinge connection; and wherein when said tailgate is pivoted about said universal hinge and said first latch, said universal hinge will pivot about said first hinge connection, and when said tailgate is pivoted about said universal hinge and said third latch, said universal hinge will pivot about said second hinge connection.

13. The mechanism of claim 12, wherein said drop down mode occurs when said tailgate pivots about said third latch and said first hinge connection, and said swing mode occurs when said tailgate pivots about said first latch and said second hinge connection.

14. A dual action tailgate, comprising:

a first handle including a lever having a shoulder, a handle lever having a slot, and a first handle lock having a raised portion, said handle lock slidably disposed within said slot of said handle lever;

a second handle including a lever having a shoulder, a handle lever having a slot, and a second handle lock having a raised portion, said second handle lock slidably disposed within said slot of said handle lever;

said lever of said first handle rotatable about a first axis, and said handle lever of said first handle and said first handle lock pivotable about a second axis;

said lever of said second handle rotatable about a third axis, and said handle lever of said second handle and said second handle lock pivotable about a fourth axis;

a first latch operably associated with said first handle;

a second latch operably associated with said first handle and said second handle;

a third latch operably associated with said second handle;

a first idle feedback rod connected to said first handle lock and said handle lever of said second handle;

a second idle feedback rod connected to said second handle lock and said handle lever of said first handle;

a universal hinge operably associated with said first latch, said second latch, and said third latch; and wherein when said lever of said first handle is rotated about said first axis, said shoulder of said lever of said first handle will apply force to said raised portion of said first handle lock, causing said first handle lock and said handle lever of said first handle to rotate about said second axis and said first idle feed back rod to move said second handle lock in said slot of said handle lever of said second handle, and when said lever of said second handle is rotated about said third axis, said shoulder of said lever of said second handle will apply force to said raised portion of said second handle lock, causing said first handle lock and said handle lever of said second handle to rotate about said fourth axis and said second idle feedback rod to move said first handle lock in said slot of said handle lever of said first handle.

15. The tailgate of claim 14, further comprising:

a first dual action cable rod connected to said handle lever of said first handle and said first latch;

a second dual action cable rod connected to said handle lever of said second handle and said third latch;

a single action cable rod connected to said handle lever of said first handle and said second latch, said single action cable rod extending through a cylinder, said cylinder operably associated with said second handle; and wherein when said first handle lock and said handle lever of said first handle are rotated about said second axis, said handle lever of said first handle will actuate said first dual action cable rod to release said first latch, and said handle lever of said first handle will actuate said single action cable rod to release said third latch, and when said second handle lock and said handle lever of said second handle are rotated about said fourth axis, said handle lever of said second handle will actuate said second dual action cable rod to release said third latch, and said handle lever of said second handle will actuate said single action cable rod to release said second latch.

16. The tailgate of claim 15, wherein when said first latch and said second latch are released, said tailgate will pivot about said universal hinge and said third latch.

17. The tailgate of claim 15, wherein when said second latch and said third latch are released, said tailgate will pivot about said universal hinge and said first latch.

18. The tailgate of claim 14, wherein when said first idle feedback rod slides said second handle lock in said slot of said handle lever of said second handle, said shoulder of said lever of said second handle is rotatable about said third axis without contacting said raised portion of said second handle lock.

19. The tailgate of claim 14, wherein when said second idle feedback rod slides said first handle lock in said slot of said handle lever of said first handle, said shoulder of said lever of said first handle is rotatable about said first axis without contacting said raised portion of said first handle lock.

20. The tailgate of claim 14, wherein said universal hinge further comprises:

a first support having a first set of extensions, said first set of extensions having a set of holes;

a second support having a second set of extensions, said second set of extensions having a set of holes, and said second support connected to said tailgate;

a joiner operably associated with said first support and said second support;

a first pin inserted through said holes of said first set of extensions and said joiner to form a first hinge connection;

a second pin inserted through said holes of said second set of extensions and said joiner to form a second hinge connection; and wherein when said tailgate is pivoted about said universal hinge and said first latch, said universal hinge will pivot about said first hinge connection, and when said tailgate is pivoted about said universal hinge and said third latch, said universal hinge will pivot about said second hinge connection.

* * * * *